Dec. 20, 1966  R. H. NEWTON  3,293,154
PROCESS FOR SEPARATING WATER FROM AQUEOUS METHANOL MIXTURES
Filed Feb. 15, 1963
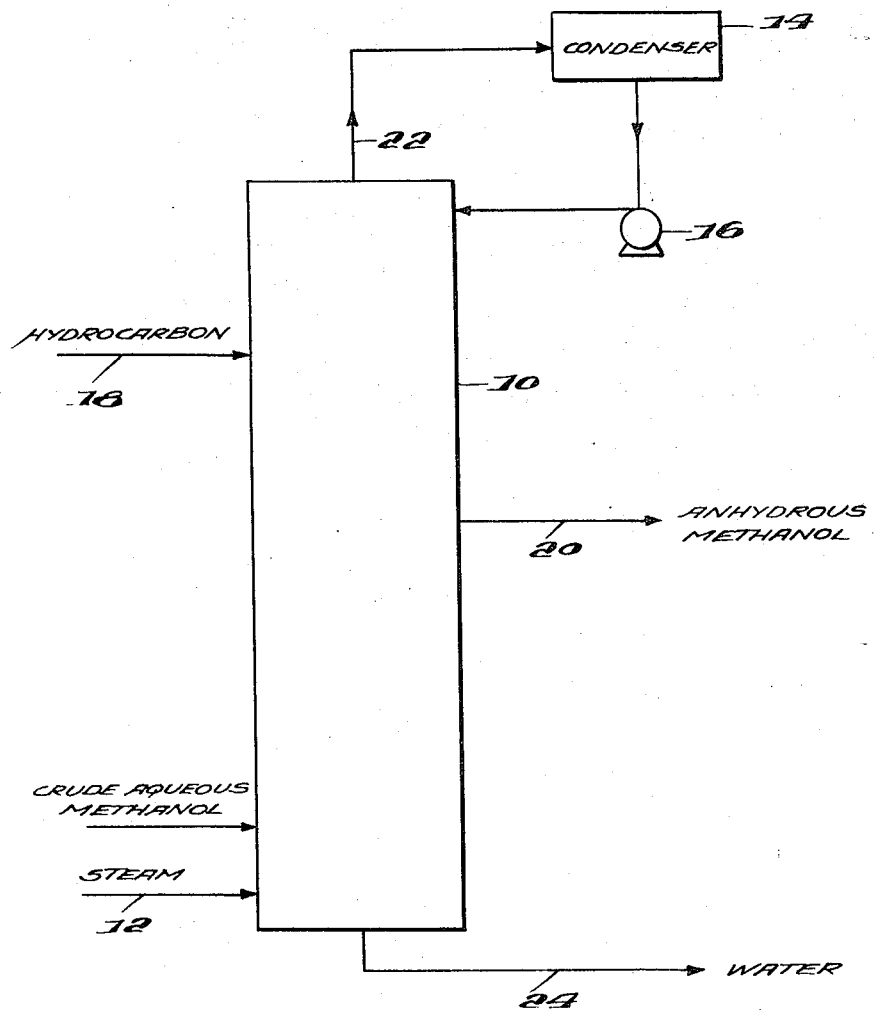
INVENTOR.
ROGER H. NEWTON,
BY
McLean, Morton and Boustead
ATTORNEYS United States Patent Office 3,293,154
Patented Dec. 20, 1966

3,293,154
PROCESS FOR SEPARATING WATER FROM AQUEOUS METHANOL MIXTURES
Roger H. Newton, % Commercial Solvents Corp., 3 Elk Drive, Terre Haute, Ind. 47802
Filed Feb. 15, 1963, Ser. No. 258,911
2 Claims. (Cl. 203—18)

The present invention relates to an improved process for the production of substantially anhydrous alcohol from a mixture of alcohol and water. More particularly it relates to a method for drying alcohol, e.g. methanol.

Attempts to reduce the water content of a mixture of methanol and free water to but a few parts per million (p.p.m.) water so as to secure an essentially anhydrous methanol have generally met with little or no success. Among the methods that have proposed to remove water from methanol, many involved the use of hygroscopic salt or salts which readily formed hydrates such as, for example, $CaCl_2$, $CaSO_4$ or $Na_2SO_4$. The use of glycerol alone or in combination with hygroscopic salts has also been proposed. The use of these agents has been unsatisfactory commercially due to a variety of causes. For example, $CaCl_2$ unites chemically with methanol to form addition compounds. The recovery of the dehydrating ingredients is frequently involved and expensive, necessitating an extensive outlay for equipment. Reagents such as metallic calcium, aluminum, magnesium and sodium have been used but they have not been practical commercially. For instance, economical and chemical difficulties have made the use of, say, metallic sodium inexpedient on a large scale. These difficulties include such considerations as the high cost of metallic sodium and the difficulties of shipping and handling it. Moreover, problems arise with its use such as the production of hydrogen and heat with aqueous methanol which in turn give rise to serious fire and explosion hazards.

The distillation method for removing water from a methanol-free water mixture has also been employed. Generally, the methanol produced by this method contains water in amounts, for instance, from about 100 to 1000 p.p.m., often up to about 2000 p.p.m. There are situations, however, which require the use of methanol which must contain substantially less than 100 p.p.m. water. The process of the present invention affords a commercially satisfactory method for producing alcohol, e.g. methanol, which is essentially anhydrous, i.e. it contains less than about 100 p.p.m. of water.

In accordance with the present invention, an alcohol-, e.g. methanol-, free water mixture in vapor form is contacted with a water-insoluble, normally liquid, hydrocarbon, having a boiling point substantially no higher than the boiling point of the alcohol in the mixture, to form an azeotrope with the free water which azeotrope has a boiling point differing from the boiling point of the alcohol by a difference sufficient to allow separation from the alcohol to produce an essentially anhydrous alcohol.

The process of the present invention can be advantageously conducted during distillation of the alcohol, e.g. methanol, from a mixture containing methanol and water. In such a distillation process, substantially anhydrous methanol may be produced by introducing the water-insoluble hydrocarbon in small amounts into the distillation column at a height in the column to contact the vaporous methanol where the methanol is in admixture with a minimum amount of water. The anhydrous methanol product can be removed from the column at a height below the height where the water-insoluble hydrocarbon is introduced. Preferably the water-insoluble hydrocarbon is introduced into the column midway between the product, i.e. substantially anhydrous alcohol, outlet and the top of the column. Other impurities may also be present at the point of water-insoluble hydrocarbon introduction such as lighter boiling point materials.

The water-insoluble hydrocarbon employed in the process of the present invention may be any which will form with the water in admixture with alcohol, e.g. methanol, an azeotropic or constant boiling mixture having a boiling point differing from the boiling point of methanol (B.P. 64° C.) by a difference sufficient to allow separation of the azeotrope and methanol, for instance a difference greater than about 5° C., e.g. about 5° to 20° C. lower than the boiling point of methanol. Among the suitable water-insoluble hydrocarbons are those generally containing from about 3 to 8 or 10 carbon atoms, for instance mono-ring aromatics, e.g. benzene, cycloalkanes, e.g. cyclopentane, and alkanes, e.g. pentane. The hydrocarbons can have substituents other than hydrogen and carbon as long as the substituent does not deleteriously affect the operation of the water-insoluble hydrocarbon in the present invention.

The water-insoluble hydrocarbon is contacted with a vaporous methanol-water mixture in amounts sufficient to remove water from the mixture. These amounts will depend upon the water-removing efficiency of the particular water-insoluble hydrocarbon used and will generally be about 1 to 3 moles of hydrocarbon per mole of water present in the methanol-water mixture. When the present process is incorporated in the distillation of methanol as aforementioned, the amount used will depend upon the amount of water in the vaporous methanol-water mixture at the height of column where the water-insoluble hydrocarbon is introduced. This amount can be about 0.02 to 0.06 weight percent of the vaporous methanol-water mixture. Preferably, the water-insoluble hydrocarbon is one boiling at or below the boiling point of the alcohol, e.g. about 65° C. for methanol, and forms an aqeous azeotrope which is lower-boiling than the alcohol. Since the water-insoluble hydrocarbons can be of relatively high volatility, the azeotrope formed will generally not pass down the column below the point of introduction of the water-insoluble hydrocarbon or at least it will be substantially absent from the point of product (e.g. essentially anhydrous methanol) withdrawal which insures essentially an anhydrous product at such withdrawal point.

The following example will further illustrate the present invention when taken in conjunction with the attached drawing wherein the sole figure schematically illustrates the invention.

*Example I*

Essentially complete drying of crude, partially purified aqueous methanol containing about 500 p.p.m. water in a distillation tower 10 is effected. The methanol-water mixture is distilled into distillation tower 10 having a plate column and a reflux ratio of about 2.6 units of reflux per unit of net product. The plate column is equipped to reboil the base by steam injection through line 12 and is provided with a condenser 19 and pump 16 for returning reflux to the top of the column 10.

Water-insoluble hydrocarbon, benzene in this instance, is introduced through line 18 near the top of the tower about midway between said top and an essentially anhydrous methanol product outlet 20. The tower contains a number of contacting trays such as bubble cap plates and heat is applied to the bottom of the tower by means of a steam injection reboiler at line 12. As the methanol-water mixture is distilled, the vapor composition increases in the methanol component as it progresses up the column. The vapors which consists essentially of methanol, water and traces of lighter boiling materials (if present in the feed), are removed overhead through line 22. These vapors are condensed in the condenser 14 from which reflux is returned to the tower top.

In order to reduce the water content of the methanol vapor in accordance with the present invention, the benzene, introduced at the position as stated above, is supplied in molar amounts equal to the molar amount of water in the methanol-water vapor at the point of benzene introduction. The bottoms comprising water is withdrawn through an outlet line 24 at the bottom of the tower which is heated by injecting steam. The essentially anhydrous methanol produced contains about 25 p.p.m. water.

Such design factors as the number of plates in the tower, the reflux ratio and exact point of introduction of water-insoluble hydrocarbon and product removal can be varied for the process by those skilled in the art. The latter two determinations, for instance, will vary on the number of plates employed and on the rate and character of the feed and the particular water-insoluble hydrocarbon chosen. A criteria, however, for the proper position for the introduction of water-insoluble hydrocarbon is that the hydrocarbon inlet line be sufficiently disposed above the product outlet line so that, due to its volatility, none of the hydrocarbon as introduced or in an azeotropic form will pass down to the essentially anhydrous alcohol product outlet.

It is claimed:

1. In a process for separating water from a water methanol mixture to produce a methanol product with a reduced water content, the steps which comprise introducing a crude aqueous methanol mixture into a distillation column, distilling the aqueous methanol mixture in said distillation column to provide a methanol-water vapor, introducing into said column a water-insoluble normally liquid hydrocarbon which forms an azeotrope with the water which azeotrope has a boiling point lower than the boiling point of methanol, said water-insoluble hydrocarbon being contacted with the vaporous methanol-water mixture in molar amounts of about 1 to 3 times the molar amount of water present in the methanol-water mixture in the column at the height of water-insoluble hydrocarbon introduction, said hydrocarbon having a boiling point substantially no higher than the boiling point of methanol in the mixture, and recovering an essentially anhydrous methanol product with a reduced water content at a height in the column below the height where water-insoluble hydrocarbon is introduced and above the point of crude aqueous methanol mixture introduction, said hydrocarbon being introduced at a height in the column where the vapor contains a minimum amount of water, said height of minimum amount of water being between the point of said essentially anhydrous methanol product recovery and the top of the column, and removing essentially water from the bottom of the column at a point below the point of said essentially anhydrous methanol product recovery.

2. The method of claim 1 wherein the water-insoluble hydrocarbon is introduced at a point about midway between the product outlet and the top of the column.

References Cited by the Examiner
UNITED STATES PATENTS

| | | | |
|---|---|---|---|
| 1,586,732 | 6/1926 | Clapp | 203—19 |
| 1,676,735 | 7/1928 | Keyes | 203—19 |
| 1,860,554 | 5/1932 | Ricard et al. | 203—19 |
| 2,000,043 | 5/1935 | Shiffler | 203—18 |
| 2,173,692 | 9/1939 | Marples | 203—19 |
| 2,561,680 | 7/1951 | Wilke | 203—46 |

NORMAN YUDKOFF, *Primary Examiner.*

WILBUR BASCOMB, *Examiner.*

F. E. DRUMMOND, *Assistant Examiner.*